UNITED STATES PATENT OFFICE.

MOSES MILTON BAUMGARTNER, OF FREEPORT, ILLINOIS.

PROCESS OF TREATING RICE AND PRODUCT THEREOF.

1,239,555.     Specification of Letters Patent.     Patented Sept. 11, 1917.

No Drawing.     Application filed December 13, 1916. Serial No. 136,765.

*To all whom it may concern:*

Be it known that I, MOSES MILTON BAUMGARTNER, a citizen of the United States, residing at Freeport, in the county of Stephenson and State of Illinois, have invented certain new and useful Improvements in Processes of Treating Rice and Products Thereof; and I do declare the following to be a full, clear, and exact description of the invention, such as will enable others skilled in the art to which it appertains to make and use the same.

This invention relates to a novel preservative process for treating rice and to a product resulting from such process.

The primary object of my invention is to provide a whole rice containing all the natural food elements; rice that will keep during any and all kinds of weather; which is not adulterated; which is thoroughly cooked and the starches therein rendered ready for the use of the body; which is delightfully flavored without the addition of any foreign materials; which constitutes an ideally balanced food capable of sustaining human life; and which is cheaper when its heat producing units and its nerve and muscle producing material are considered than any single known food.

A further object of my invention is the provision of a preservative process for treating rice to produce a more palatable and commercially available product, the entire food value of the natural rice being conserved and the product being rendered more stable and thereby incapable of deterioration, without discarding any of the food elements of the natural rice and without adulteration as now commonly practised in preparing rice for the market.

Having these general objects in view and others which will appear as the nature of the improvements is better understood the invention consists in the novel product and process hereinafter fully described and pointed out in the appended claims.

Commercial rice as now found on the market is prepared by subjecting it to a number of polishing or scouring processes which mechanically remove all the proteids and fats from the rice grain and leave nothing but the inner or starchy bulk. This part of the grain is then treated to a coating of glucose and also to a coating of talc and it is then ready for the general market. This treatment renders the rice not only an impoverished food but an adulterated food as well and it is to overcome these objections, as well as to produce a more palatable and stable product than commercial rice, that applicant has devised his process.

In carrying out my process the rough rice is taken as delivered from the threshing machine and soaked in water from four to twelve hours until the rice has absorbed substantially all the water possible, and excess water if any is then withdrawn and the rice is cooked in live steam for from fifteen minutes to one hour.

The rice is then dried by heating until it has reached its original bulk or until the water taken up in the soaking and cooking processes has all been eliminated. The drying process is continued at a sufficient temperature to parch the rice thereby imparting a desirable flavor to the product which is passed to a hulling machine where the hulls are removed. From the hulling machine the product is passed to a separating machine which removes the dust, hulls and unhulled grains. The product is then conveyed to a filling machine where it is disposed in air tight containers, labeled and packed for the market.

The parching step adds flavor to the rice and greatly increases its palatability, the natural flavor of rice being rather flat.

This process as described above preserves all of the natural food qualities of the rice which consists of 7.2% proteids; 2% fats 76.8% carbo-hydrates, 1% cellulose and 1% minerals.

As the fats in the germs and the layers of cuticle break down easily it is stabilized by the heating process, therefore does not become rancid. The steam process sterilizes the grain and when it is placed in air-tight packages it cannot become wormy no matter for how long a time it may be kept.

The result of my process is a palatable and sterile food product in which the fats and proteids are stabilized and the starch is dextrinized, insuring its keeping qualities and its rapid conversion into a digestible food when prepared for the table. All of the valuable food ingredients of the rice are retained in my product so there is no waste and it provides a balanced food without the necessary addition of other food elements.

From the above description it will thus be obvious that the rice produced by this process is a whole rice containing all of its natural food elements and which will retain its nutritive value, be highly palatable and more readily assimilated than the rice now used commercially.

I claim:

1. A product comprising sterilized dry rice kernels embodying the whole natural rice, including the germ and cuticle, with the starch dextrinized and the fats and proteids stabilized, and having substantially the original form and bulk of the natural rice.

2. A product comprising parched rice kernels embodying the whole natural rice, including the germ and cuticle, with the starch dextrinized and the fats and proteids stabilized, and having substantially the original form and bulk of the natural rice.

3. A preservative process of preparing natural rice which consists in thoroughly soaking the natural rice, in the hull, thereby causing it to absorb a quantity of water, cooking the rice in live steam, while in the hull, to preserve the nutritive value thereof, drying the rice under conditions which insure a product not differing materially in form and bulk from the natural rice, and removing the hulls from the rice kernels.

4. A preservative process of treating natural rice which consists in soaking the whole natural rice, in the hull, thereby causing it to absorb a quantity of water, cooking the rice in live steam, while in the hull, to dextrinize the starch and to stabilize the fats and proteids of the germ and cuticle, subjecting the rice to drying conditions until the water is extracted, continuing the drying conditions to parch the rice and produce a final product not differing materially in form and bulk from the natural rice and removing the hulls from the rice kernels.

In testimony whereof I have hereunto set my hand in the presence of two subscribing witnesses.

MOSES MILTON BAUMGARTNER.

Witnesses:
WILLIAM NEESE,
ANNA M. GRANSDEN.